US010491967B1

(12) United States Patent
Sismondo et al.

(10) Patent No.: US 10,491,967 B1
(45) Date of Patent: Nov. 26, 2019

(54) INTEGRATING A LIVE STREAMING VIDEO SERVICE WITH EXTERNAL COMPUTING SYSTEMS

(71) Applicant: Amazon Technologies, Inc., Seattle, WA (US)

(72) Inventors: Charles Lawrence Sismondo, Carlsbad, CA (US); Aakash Deep Makkar, Aliso Viejo, CA (US); Harmeet Singh Gorwara, Aliso Viejo, CA (US); Glenn Warren Van Houten, San Diego, CA (US); Thomas James Rader, Long Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/977,310

(22) Filed: Dec. 21, 2015

(51) Int. Cl.
*H04N 21/81* (2011.01)
*H04N 21/2187* (2011.01)
*H04N 21/61* (2011.01)
*H04N 21/478* (2011.01)
*H04N 21/84* (2011.01)

(52) U.S. Cl.
CPC ..... *H04N 21/8166* (2013.01); *H04N 21/2187* (2013.01); *H04N 21/47815* (2013.01); *H04N 21/6125* (2013.01); *H04N 21/84* (2013.01)

(58) Field of Classification Search
CPC ........... H04N 21/2187; H04N 21/4788; H04N 21/8166; H04N 21/6125; H04N 21/47815; H04N 21/84
See application file for complete search history.

(56) References Cited

U.S. PATENT DOCUMENTS

| 2003/0038805 | A1* | 2/2003 | Wong | A63F 13/12 345/473 |
| 2005/0262542 | A1* | 11/2005 | DeWeese | H04L 12/1818 725/106 |
| 2010/0248699 | A1* | 9/2010 | Dumais | H04L 67/1095 455/414.1 |
| 2013/0012310 | A1* | 1/2013 | Shepard | A63F 13/10 463/29 |
| 2015/0121437 | A1* | 4/2015 | Tan | H04N 21/2187 725/93 |
| 2016/0317933 | A1* | 11/2016 | Shoshan | A63F 13/422 |

* cited by examiner

*Primary Examiner* — Kunal Langhnoja
(74) *Attorney, Agent, or Firm* — BakerHostetler

(57) ABSTRACT

Technologies are disclosed for integrating a live streaming video service with other computing systems and services. A live streaming video service exposes a network service API through which requests for identifiers for live video streams can be submitted. An API request can include context data obtained or generated by a user device, such as data defining the state of an application executing on the user device or data identifying the type of user device making the request. The context data can also be obtained or generated by an application store system or a merchant system. The context data and metadata associated with live video streams can be used to select one or more of the live video streams. Unique identifiers corresponding to the selected live video streams can be returned in response to a call to the API. The identifiers can be utilized to access the corresponding live video streams.

19 Claims, 9 Drawing Sheets

INTEGRATING A LIVE STREAMING VIDEO SERVICE WITH EXTERNAL COMPUTING SYSTEMS

BACKGROUND

Live streaming video services allow users to generate and share live video streams with other users in real or near-real time. These services also allow other users to view the live video streams in real or near-real time. For example, one user of such a live streaming video service might play a game on a device configured to stream its video output in real or near-real time to the live streaming video service. Other users can utilize their own devices to watch the live video stream of the gameplay, also in real or near-real time. The live streaming video service can also provide other types of functionality, such as for allowing users to engage in text chat or other types of communications while watching a live video stream.

While live streaming video services such as those described above provide meaningful functionality for allowing users to broadcast and view live video streams, these types of services are commonly limited in their ability to interact with other external computing systems and network services. As a result, it can be very difficult for users of such live streaming network services to discover live video streams of interest. Moreover, some users might not even be aware that such live streaming video services exist. As a result, these users might never know that the potentially relevant live video content provided from a live video streaming service is available for consumption.

The disclosure made herein is presented with respect to these and other considerations.

DETAILED DESCRIPTION

Figure 1:
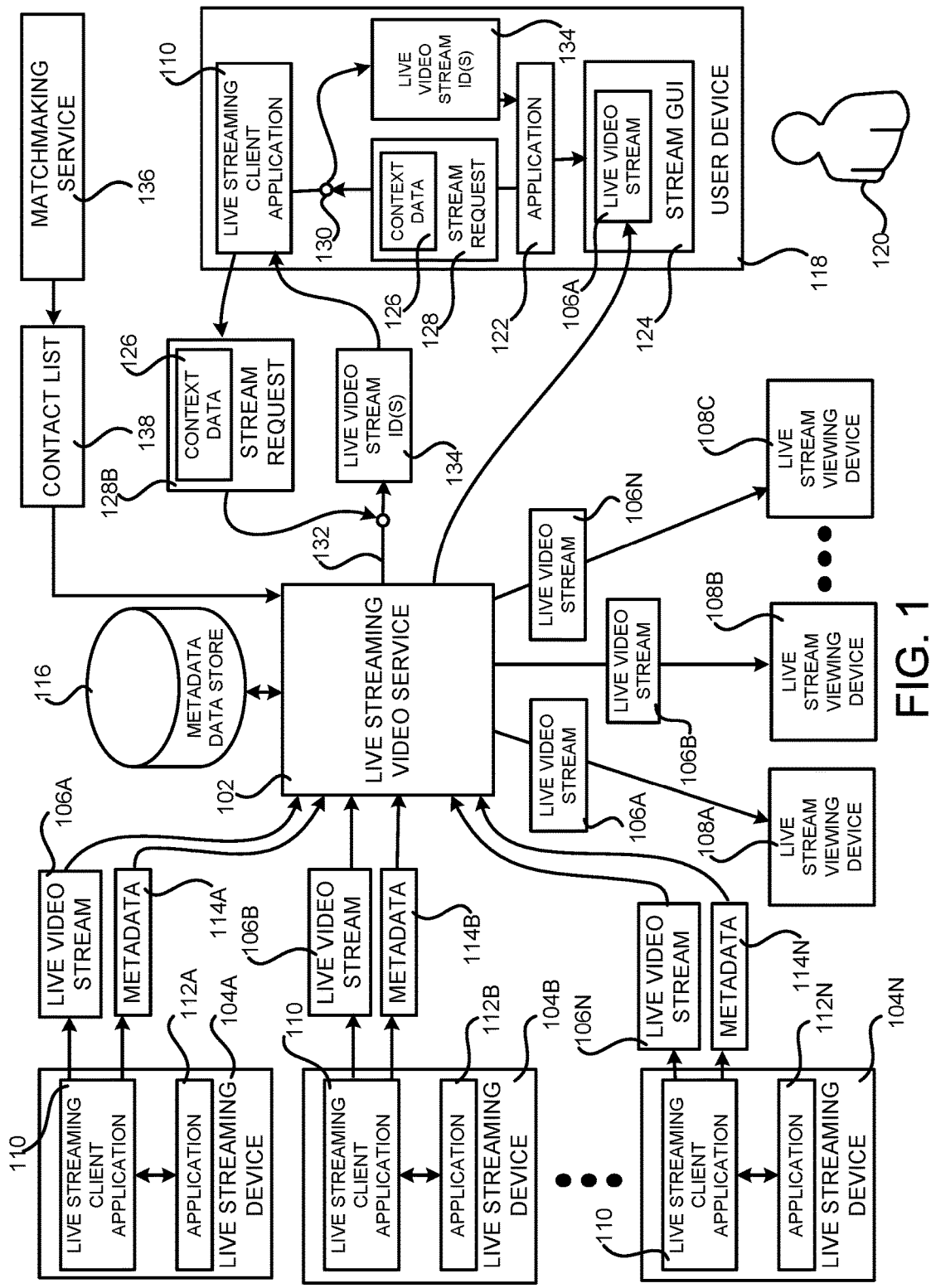
FIG. 1 is a system architecture diagram showing aspects of the configuration and operation of one mechanism disclosed herein for integrating a live streaming video service with a user device.

The following detailed description is directed to technologies for integrating a live streaming video service with other external computing systems. Utilizing an implementation of the technologies described herein, a live streaming video service can be integrated with other external computing systems such as, but not limited to, user devices, application store systems, merchant systems and, potentially, other types of computing systems and network services. Through such an implementation, these services and systems can enable users to discover live video streams available from a live streaming video service that contain content relevant to their particular context. Additionally, through various types of integrations, even users that do not have an account with such a live streaming video service can be provided with live video streams that are relevant to their context at a given point in time. The disclosed integrations can also provide additional technical benefits including, but not limited to, more efficient network communication, reduced memory or mass storage usage, and others.

In order to enable the functionality disclosed briefly above, the technologies disclosed herein operate in conjunction with a live streaming video service. As discussed briefly above, live streaming video services allow users to generate and share live video streams with other users in real or near-real time. These services also allow other users to view the live video streams in real or near-real time. For example, and as mentioned briefly above, one user of such a live streaming video service might play a game on a computing device configured to stream its output in real or near-real time to the live streaming video service. Other users can utilize their own computing devices to watch the live video stream of the gameplay, also in real or near-real time. The live streaming video service can also provide other types of functionality, such as for allowing users to engage in text chat or other types of communications while sharing or watching a live video stream.

In one configuration, a mechanism is provided for integrating a live streaming video service with user devices in ways that are not currently possible. In particular, a user device such as a console video game system, a smartphone, tablet computing device, or personal computer can be configured with a live streaming client application that provides functionality for integrating with a live streaming video service. For example, the live streaming client application can provide an interface through which other applications executing on the user device can stream their live video output to the live streaming video service. The live streaming client application can also provide functionality for retrieving live video streams from the live streaming video service, displaying the live video streams on a display device, for enabling text chat functionality between users of the live streaming video service, and other types of functionality.

In one configuration, the live streaming client application also provides an interface through which other applications executing on the user device can locate live video streams that are relevant to the current context of a user. For instance, in one specific configuration, the live streaming client application provides a local application programming interface ("API") that other applications executing on a user device can call in order to obtain identifiers, such as the network address, for live video streams. In particular, an application can submit a stream request to the API exposed by the live streaming client application that includes context data.

The context data can identify a current (i.e. just prior to the time the call is made to the API) state of the application making the request. For example, and without limitation, if the application is a game program, the context data might identify a particular level within the game that is currently being played. The context data can also identify the type of the user device making the request. For example, the context data can indicate that the user device is a particular brand of game console or another type of device. Other types of context data can also be utilized, which will be described in greater detail below.

In response to receiving a stream request, the live streaming client application can generate a request to the live streaming video service for identifiers corresponding to relevant live video streams. Such a request can be made to a network service API exposed by the live streaming video service, and can also include the context data supplied by the application executing on the user device. In response to receiving such a request, the live streaming video service can utilize the context data to identify one or more relevant live video streams from potentially thousands, or hundreds of thousands, of live video streams.

In one configuration, the live streaming video service utilizes metadata associated with the live video streams to identify live video streams relevant to the supplied context. The metadata might, for example, describe the state of an application being shown in a live video stream, such as the level of a game program that is being played. The live streaming video service can also expose a network service API through which the metadata associated with a live video stream can be submitted. The broadcaster of a live video stream might, for instance, utilize such an API to submit metadata regarding a live video stream that they are broadcasting. The live streaming video service can receive the metadata and store the metadata in an appropriate data store.

The live streaming video service can also utilize other types of metadata and data to select live video streams that are relevant to the context of a particular user at a particular point in time. For instance, in one configuration, the live streaming video service can utilize a user's contact list, such as that provided by a game matchmaking service or a social network, to select live video streams being broadcast by a user's contacts. Other types of information can also be utilized.

Once one or more relevant live video streams have been identified, the live video streaming service provides a reply to the live streaming client application with the identifiers ("IDs") of the identified live video streams. For example, the live streaming video service can provide network addresses for the live video streams that can be utilized by the user device to retrieve the live video streams. In turn, the live streaming client application provides the IDs to the calling application.

The calling application can then utilize the IDs to generate a suitable graphical user interface ("GUI") for presenting the identified live video stream, or streams, which might be referred to herein as a "stream GUI." For example, and without limitation, using the mechanism described briefly above and more fully below, an application can present a live video stream showing gameplay from a game that a user has just started playing on the user device. In another example, a live video stream can be presented that shows gameplay from a level in a game that a user is currently playing. In this manner, a user can obtain live video streams that include content that is relevant to their particular context (i.e. location in a game or other application) in a seamless and automated fashion. Other types of live video streams containing other types of content can also be selected and provided to users in other types of contexts or situations.

In another configuration, a mechanism is provided for integrating a live streaming video service with an application store provided by an application store system. The application store system provides an application store (which might be referred to herein as an "app store") that exposes functionality for allowing users to browse and obtain applications for free or for a fee. For example, and without limitation, an app store system can enable a user utilizing a smartphone or tablet computing device to browse and obtain various types of applications that are suitable for use on the user's particular type of computing device. Applications available through an app store can be provided by the operator of the app store system or by third-party application developers.

An application store client application can be executed on a user device in order to access the functionality provided by the app store system. The application store client application, for example, can submit requests to the app store system for pages containing information about an application or applications such as text, images, videos, and/or audio files, that correspond to applications in the app store. In response thereto, the app store system can return the requested page which, in turn, can be presented in a suitable GUI, which might be referred to herein as an "app store GUI."

In some configurations, page requests submitted to the app store system by the application store client application can also include context data identifying the current context of a user (i.e. at the time the page request is made) such as, but not limited to, that described above. The app store system can supply the context data in calls to the network service API exposed by the live streaming video service to obtain IDs for live video streams relevant to the user browsing or searching the app store. In some configurations, the app store system also supplies additional context data. For example, and without limitation, the additional context data can identify the page that the app store client has requested from the application store system. In this way, live video streams can be selected that include content relevant to the requested page. The additional context data can also indicate previous application purchases or in-application purchases ("IAPs") made by the user. This additional context data can also be utilized by the live streaming video service to select live video streams relevant to the user.

Once one or more relevant live video streams have been identified, the live video streaming service provides a reply to the app store system with the IDs of the identified live video streams. For example, the live streaming video service can provide network addresses for the live video streams that can be utilized by the user device to retrieve the live video streams. In turn, the app store system provides the IDs to the requesting app store client application.

The app store client application can then utilize the IDs to retrieve the identified live video stream, or streams, from the live streaming video service, and display the stream in the app store GUI. For example, and without limitation, using the mechanism described briefly above and more fully below, an app store client application can present a live video stream showing gameplay from a game that a user is viewing in the app store. In another example, a live video stream can be presented that shows the use of an IAP item that a user is viewing in the app store. In this manner, a user can obtain live video streams that include content that is relevant to their particular location within an app store and/or relevant to their previous purchase history from the app store in a seamless and automated fashion. Other types of live video streams containing other types of content can also be selected and provided to users while searching or browsing an app store in a similar fashion.

In yet another configuration, a mechanism is provided for integrating a live streaming video service with a merchant system that provides e-commerce functionality. The merchant system provides an e-commerce store that provides functionality for allowing users to browse and purchase various types of items including, but not limited to: physical goods, such as TVs, game consoles, cameras, bikes, and Compact Disks; digital media products, such as digital audio or video tracks or streaming media; event tickets; media or service subscriptions; and virtually any other type of good or service.

A merchant system client application can be executed on a user device in order to access the functionality provided by the merchant system. The merchant system client application, for example, can submit requests to the merchant system for pages containing information about items for sale through the e-commerce store. In response thereto, the merchant system can return the requested merchant system page which, in turn, can be presented in a suitable GUI, which might be referred to herein as an "merchant system GUI."

In some configurations, page requests submitted to the merchant system by the merchant system client application can also include context data describing the current (i.e. at the time the page request is made) context of a user, such as but not limited to that described above. The merchant system can supply the context data in calls to the network service API exposed by the live streaming video service to obtain IDs for live video streams relevant to the user browsing or searching the e-commerce store. In some configurations, the merchant system also supplies additional context data. For example, and without limitation, the additional context data can identify the page of the e-commerce store that the merchant system client has requested from the merchant system. In this way, live video streams can be selected that include content relevant to the page of the e-commerce store that the user has requested. The additional context data can also identify previous purchases made by the user. This additional context data can also be utilized by the live streaming video service to select live video streams relevant to the user.

Once one or more relevant live video streams have been identified, the live video streaming service provides a reply to the merchant system with the IDs of the identified live video streams. For example, the live streaming video service can provide network addresses for the live video streams that can be utilized by the user device to retrieve the live video streams from the live streaming video service. In turn, the merchant system provides the IDs to the requesting merchant system client application.

The merchant system client application can then utilize the IDs to retrieve the identified live video stream, or streams, from the live streaming video service, and display the stream in the merchant system GUI. For example, and without limitation, using the mechanism described briefly above and more fully below, the merchant system client application can present a live video stream showing the use of an item shown on a page that a user is viewing in the e-commerce store. In this manner, a user can obtain live video streams that include content that is relevant to their particular location within an e-commerce store and/or relevant to their previous purchase history from the e-commerce store in a seamless and automated fashion. Other types of live video streams containing other types of content can also be selected and provided to users while searching or browsing an e-commerce store in a similar fashion. Additional details regarding the various components and processes described briefly above for integrating a live streaming video service with other external computing systems will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of one mechanism disclosed herein for integrating a live streaming video service 102 with a user device 118. As described briefly above, the live streaming video service 102 (which might be referred to herein as the "live streaming service 102"), allows users to generate and share live video streams 106 with other users in real or near-real time. The live streaming service 102 also allows other users to view the live video streams 106 in real or near-real time. For example, and as mentioned briefly above, one user of the live streaming video service 102 might play a game on a computing device (which might be referred to herein as a "live streaming device") configured to stream its video output in real or near-real time to the live streaming video service 102. Other users can utilize their own computing devices (which might be referred to herein as "live stream viewing devices") to watch the live video stream 106 of the gameplay, also in real or near-real time. In order to provide real time or near-real time live video streams 106, the live streaming video service 102 can be configured such that the latency from a live streaming device 104 to a live stream viewing device 108 is 250 ms or less. The live streaming video service 102 can also provide other types of functionality, such as for allowing users to engage in text chat or other types of communications while watching a live video stream 106.

In the example configuration shown in FIG. 1, for instance, three live streaming devices 104A-104C have been illustrated. The live streaming devices 104A-104C can be console video game systems, smartphones, tablet computing devices, personal computers, or other types of computing devices. The live streaming devices 104A-104C can also be configured with a live streaming client application 110. The live streaming client application 110 provides functionality for integrating with the live streaming video service 102. For example, the live streaming client application 110 can provide an interface through which other applications 112A-112C, respectively, executing on the live streaming devices 104A-104C can stream their live video output (i.e. the live video streams 106A-106C) to the live streaming video service 102.

The live streaming client application 110 can also provide functionality for retrieving live video streams 106 from the live streaming video service 102, displaying the live video streams on a display device, for enabling text chat functionality between users of the live streaming video service 102, and other types of functionality. In the example configurations shown in FIG. 1, three live stream viewing devices 108A-108C are being utilized to display the live video streams 106A-106C, respectively. The live stream viewing devices 108A-108C can also be console video game systems, smartphones, tablet computing devices, personal computers, or other types of computing devices. Although three live streaming devices 104A-104C and three live stream viewing devices 108A-108C have been illustrated in FIG. 1, it should be appreciated that many more such devices can be utilized in an actual implementation. Additionally, it should also be appreciated that the same computing device can be utilized as a live streaming device 104 and as a live stream viewing device 108.

In one configuration, the live streaming client application 110 also provides an interface through which other applications executing on a device can locate live video streams 106 that are relevant to the current (i.e. at the time a call is made to the interface) context of a user, such as the user 120. For instance, in one specific configuration, the live streaming client application 110 provides a local API 130 that other applications executing on a device can call in order to obtain identifiers, such as the network address, for live video streams 106.

In the example shown in FIG. 1, for instance, an application 122 executing on the user device 118 is making a call to the API 130. The user device 118 shown in FIG. 1 can also be a console video game system, smartphone, tablet computing device, personal computer, or other types of computing device. The application 122 executing on the user device 118 can submit a stream request 128 to the API 130 exposed by the live streaming client application 110 that includes context data 126. As discussed briefly above, the context data 126 can identify a current state of the application 122 making the request 128. For example, and without limitation, if the application 122 is a game program, the context data 126 might identify a particular level within the game that is currently being played by the user 120. The context data 126 can also identify the type of the user device 118 making the request. For example, the context data 126 can indicate that the user device 118 is a particular brand of game console or another type of device. The context data 126 can also specify how long a user 120 has previously watched certain live video streams 106.

According to some configurations, the context data 126 can also include data specifying an identity of the user 120, a user profile associated with the user 120, an identifier for the application 122, one or more text keywords, the current time and/or date, data relating to friends or other contacts of the user 120 such as the contact list 138, an amount of time the application 122 has been used by the user 120, a preferred language of the user 120, and/or the current geographical location of the user device 118. Other types of context data 126 can also be generated or obtained by the application 122 and submitted with a stream request 128 to the live streaming client application 110.

In response to receiving a stream request 128 from the application 122, the live streaming client application 110 can generate a request 128B to the live streaming video service 102 for identifiers 134 corresponding to relevant live video streams 106. The live video stream IDs 134 can be network addresses, such as an HTTP or HTTPS web address, at which a corresponding live video stream 106 can be obtained. Such a request 128B can be made to a network service API 132 exposed by the live streaming video service 102, and can also include the context data 126 supplied by the application 122 executing on the user device 118. In response to receiving such a request 128B, the live streaming video service 102 can utilize the supplied context data 126 to identify one or more relevant live video streams 106 from potentially thousands, or hundreds of thousands, of live video streams 106.

In one configuration, the live streaming video service 102 utilizes metadata 114 associated with the live video streams 106 to identify live video streams 106 relevant to the supplied context data 126. The metadata 114 might, for example, describe the state of an application 112 being shown in a live video stream 106, such as the level of a game program that is being played, or the time and/or date of the live video stream 106. The metadata 114 can also specify the natural language (e.g. English or Japanese) of the live video stream 106 and/or the geographic location from which a live video stream 106 is being broadcast. The metadata 114 can also include data defining a price for viewing a live video stream 106. As will be described in greater detail below, this data can be utilized in configurations where a broadcaster charges a fee to consumers of a live video stream 106. The metadata 114 can also include chat text associated with a live video stream and/or closed captioning information (i.e. text specifying the spoken text in a live video stream 106). The metadata 114 can also, or alternately, include other data in other configurations.

The live streaming video service 102 can also expose a network service API (not shown in FIG. 1) through which the metadata 114 associated with a live video stream 106 can be submitted. The broadcaster of a live video stream 106 might, for instance, utilize such an API to submit metadata 114 regarding a live video stream 106 that they are broadcasting. In the example shown in FIG. 1, for instance, metadata 114A-114C is being supplied for each of the live video streams 106A-106C, respectively. The live streaming video service 102 can receive the metadata and store the metadata 114 in an appropriate data store, such as the metadata data store 116.

The live streaming video service 102 can also utilize other types of metadata 114 and data to select live video streams 106 that are relevant to a particular user, such as the user 120. For instance, in one configuration, the live streaming video service 102 can utilize a user's contact list 138, such as that maintained and provided by a game matchmaking service 136, a social network, or another type of service, to select live video streams 106 being broadcast by a user's contacts. In the example shown in FIG. 1, for instance, the live streaming video service 102 might select video streams 106 being generated by users identified in the contact list 138 of the user 120. Such a contact list 138 can be utilized in a similar fashion in the configurations described below with regard to FIGS. 3-6.

Once the live streaming video service 102 has selected one or more relevant live video streams 106, the live video streaming service 102 provides a reply to the live streaming client application 110 with the IDs 134 of the identified live video streams 106. For example, the live streaming video service 102 can provide network addresses for the live video streams 106 that can be utilized by the user device 118 to retrieve the live video streams 106. In turn, the live streaming client application provides the live video stream IDs 134 to the calling application. In the example shown in FIG. 1, for instance, an ID 134 for the live stream 106A has been provided by the live streaming video service 102 to the live streaming client application 110 and, in turn, from the live streaming client application 110 to the application 122 in response to the stream request 128.

The calling application 122 can then utilize the supplied IDs 134 to generate a GUI for presenting the identified live video stream 106, or streams 106 (shown in FIG. 1 as the stream GUI 124). For example, and without limitation, the application 122 can present a live video stream 106A in the stream GUI 124 showing gameplay from a game that the user 122 has just started playing on the user device 118 (i.e. the application 122). In another example, a live video stream 106A can be presented that shows gameplay from a level in a game that the user 120 is currently playing on the user device 118. In this manner, the user 120 can obtain live video streams 106 that include content that is relevant to their particular context (i.e. location in a game or other application 122) in a seamless and automated fashion. Other types of live video streams 106 containing other types of content can also be selected and provided to the user 120 in other types of contexts or situations.

Figure 2:
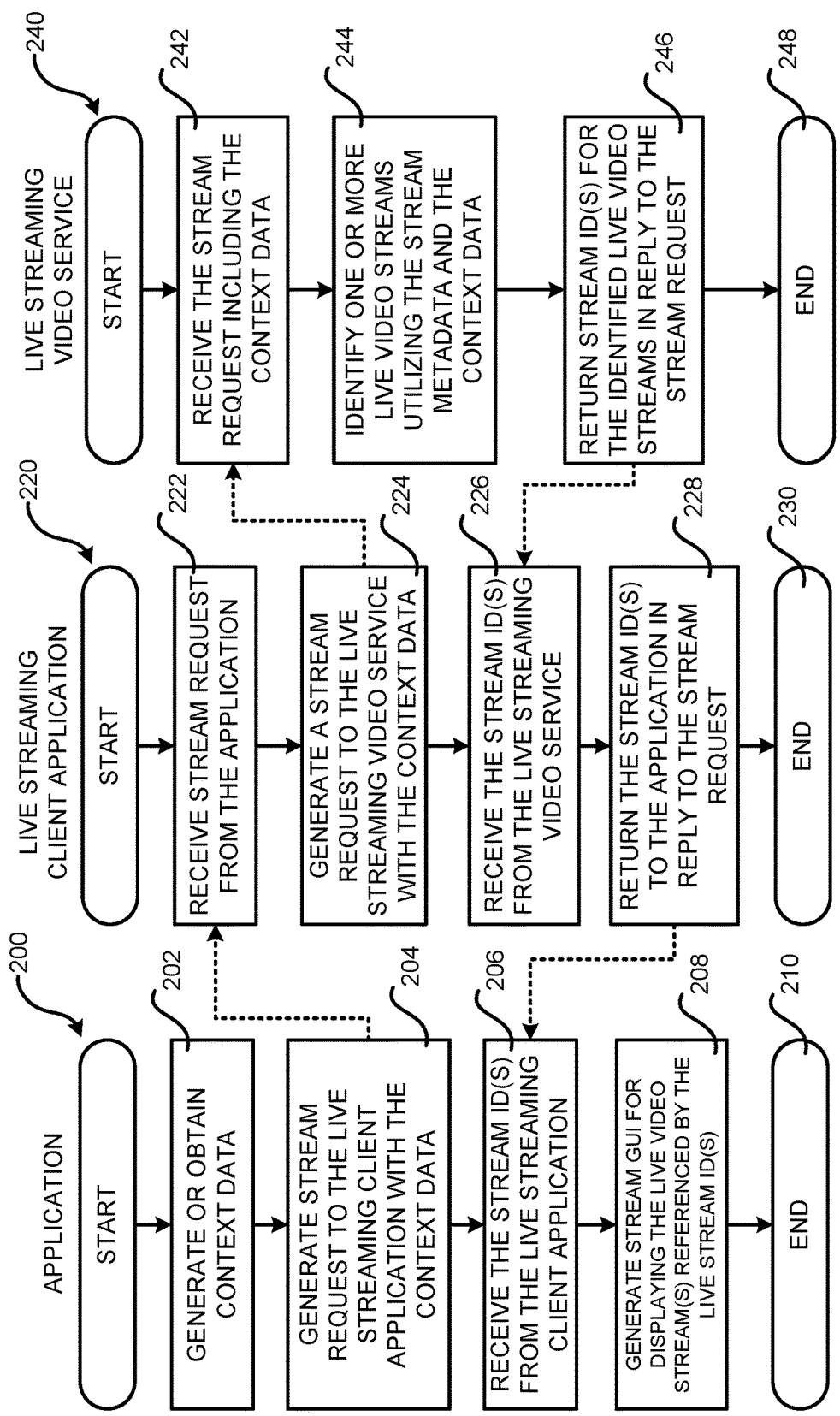
FIG. 2 is a flow diagram showing several routines that together illustrate further aspects of the mechanism shown in FIG. 1 for integrating a live streaming video service with a user device.

FIG. 2 is a flow diagram showing several routines 200, 220, and 240 that together illustrate further aspects of the mechanism shown in FIG. 1 for integrating the live streaming video service 102 with the application 122 executing on the user device 118. The routine 200 illustrates operations performed by the application 122 executing on the user device 118, the routine 220 illustrates operations performed by the live streaming client application 110, and the routine 240 illustrates aspects of operations performed by the live streaming video service 102. The routines 200, 220, and 240 will be described together below.

Figure 4:
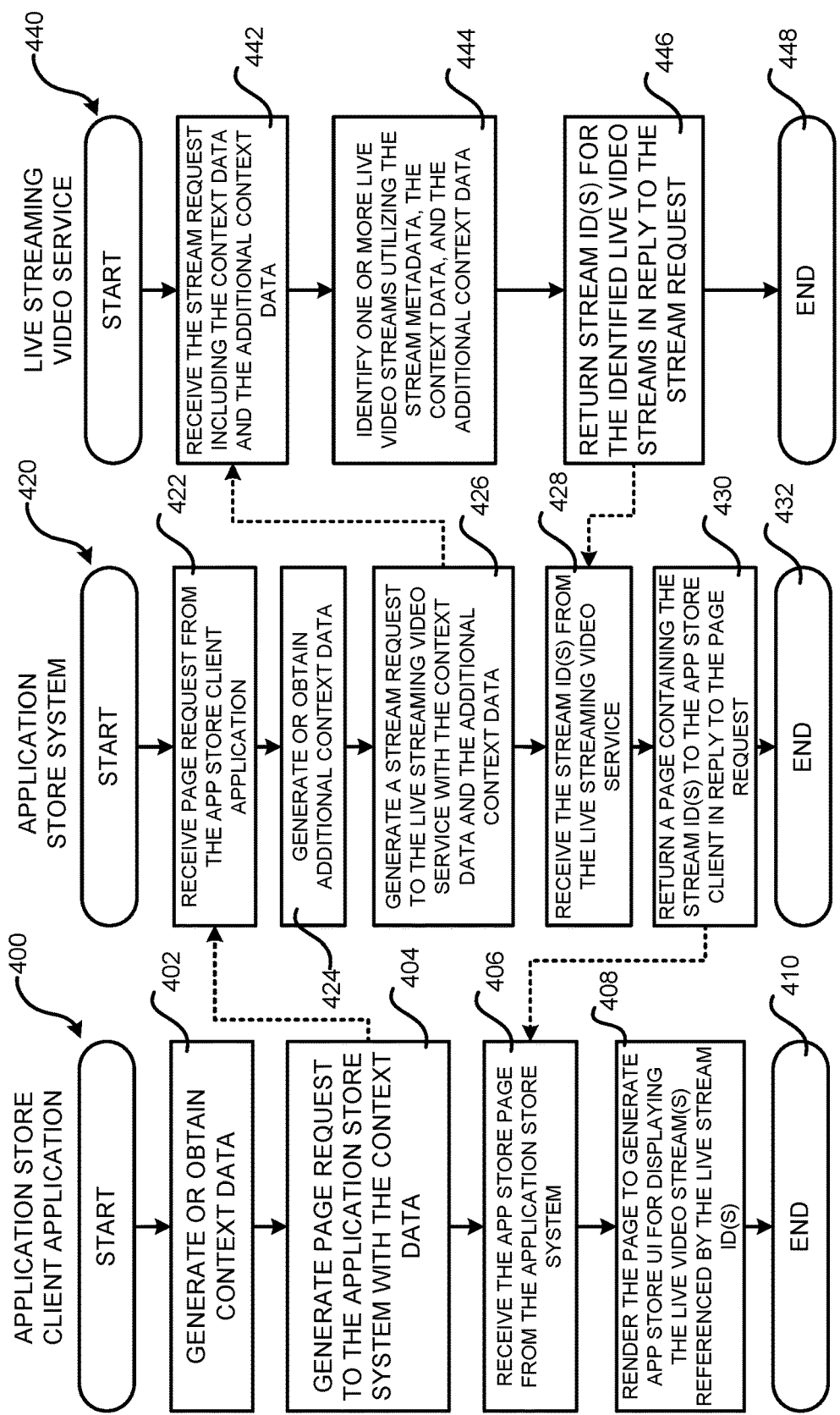
FIG. 4 is a flow diagram showing several routines that together illustrate further aspects of the mechanism shown in FIG. 3 for integrating a live streaming video service with an application store system.
Figure 6:
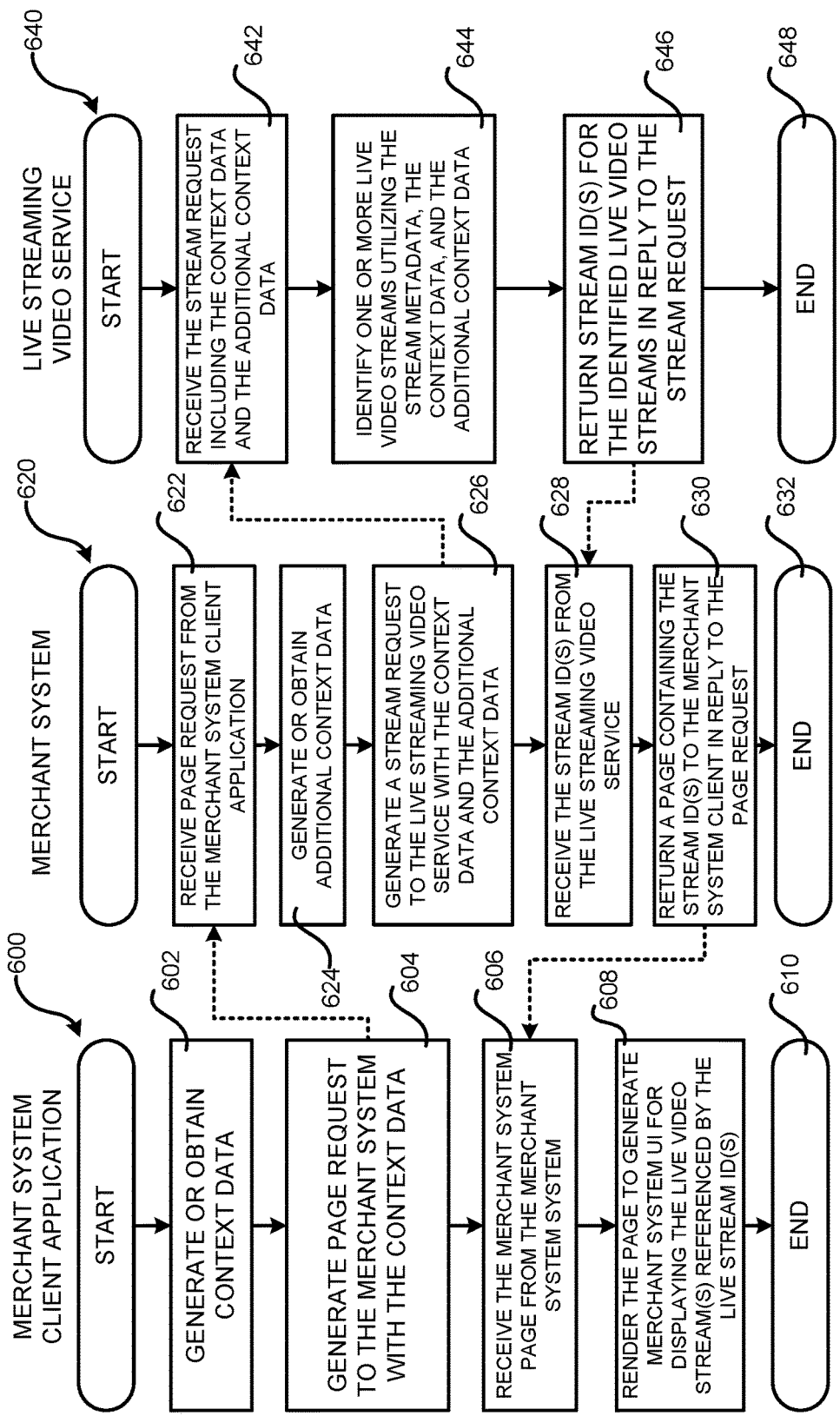
FIG. 6 is a flow diagram showing several routines that together illustrate further aspects of the mechanism shown in FIG. 5 for integrating a live streaming video service with a merchant system.

It should be appreciated that the logical operations described herein with respect to FIGS. 2, 4, 6, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the application 122 obtains or generates the context data 126. As discussed above, the context data 126 might identify a current state of the application 122, identify the type of user device 118 upon which the application 122 is executing, and/or provide other indicators of the current state of the application 122, the user device 118, and/or the user 120. Once the context data 126 has been obtained or generated, the routine 200 proceeds from operation 202 to operation 204.

At operation 204, the application 122 generates a stream request 128 to the API 130 exposed by the live streaming client application 110. The stream request 128 can include the context data 126 generated or obtained at operation 202. The live streaming client application 110 receives the stream request 128 from the application 122 at operation 222 of the routine 220. The routine 220 then proceeds to operation 224, where the live streaming client application 110 generates a stream request 128B to the network service API 132 exposed by the live streaming video service 102. The live streaming video service 102 receives the stream request 128B at operation 242 of the routine 240.

The routine 240 proceeds from operation 242 to operation 244, where the live streaming video service 102 identifies one or more live video streams 106 relevant to the context of the application 122, the device 118, and/or the user 120. In particular, and as described above, the live streaming video service 102 can search the metadata 114 stored in the metadata data store 116 for terms present in the context data 126 to identify relevant video streams 106. Other mechanisms can also be utilized. Once any relevant video streams 106 have been identified, the routine 240 then proceeds from operation 244 to operation 246, where the stream IDs 134 for the identified live video streams 106 are returned in response to the stream request 128B. The routine 240 then proceeds from operation 246 to operation 248, where it ends.

The live streaming client application 110 receives the live video stream IDs 134 at operation 226 of the routine 220. The routine 220 then proceeds from operation 226 to operation 228, where the live streaming client application 110 returns the stream IDs 134 to the application 122 in reply to the stream request 128. The routine 220 then proceeds from operation 228 to operation 230, where it ends.

The application 122 receives the stream IDs 134 at operation 206 of the routine 200. The routine 200 then proceeds from operation 206 to operation 208, where the application generates the stream GUI 124, which includes a display of the live video stream 106, or streams, referenced by the received live video stream IDs 134. The application 122 can utilize an appropriate network streaming protocol to stream the live video streams 106 from the live streaming video service 102. The stream GUI 124 can be presented full screen, in a window, as a semi-transparent overlay to a GUI provided by the application 122, or in another manner. The user 120 can also be permitted to select, close, enlarge, pause, stop, or otherwise modify the live video stream 106 shown in the stream GUI 124. From operation 208, the routine 200 proceeds to operation 210, where it ends.

It should be appreciated that the mechanism described above with regard to FIGS. 1 and 2 is merely illustrative and that other configurations can be utilized. For example, and without limitation, the functionality described above can be integrated into the application 122. In this way, the functionality described above can be provided without the use of the live streaming client application 110. Additionally, the functionality described above can be performed continuously or at various times during the execution of the application 122 in order to provide live video streams 106 to the user 120 that are relevant to the context of the application 122 at a particular point in time. For example, and without limitation, a new live video stream 106 can be obtained and presented to the user 120, when the application 122 begins executing, each time a game application begins a new level, or when the application 122 determines that a user is having difficulty completing a level. Live video streams 106 can also be provided in conjunction with the execution of an operating system (not shown in FIG. 1) or another type of program executing on the user device 118.

Figure 3:
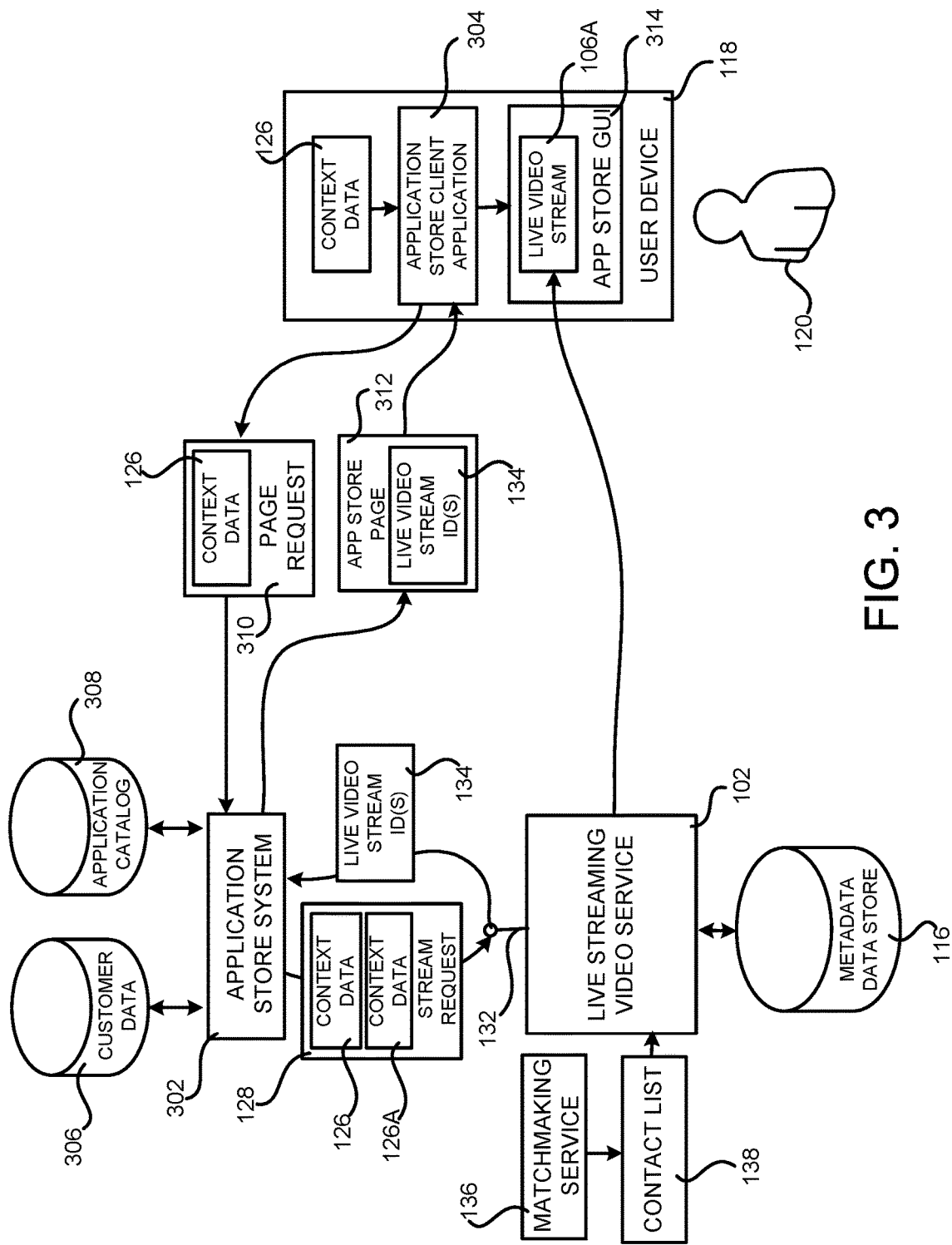
FIG. 3 is a system architecture diagram showing aspects of the configuration and operation of one mechanism disclosed herein for integrating a live streaming video service with an application store system.

FIG. 3 is a system architecture diagram showing aspects of the configuration and operation of one mechanism disclosed herein for integrating the live streaming video service 102 with an application store system 302. As described briefly above, various computing systems and software components, illustrated in FIG. 3 as the application store system 302, can be configured and operated to provide an application store (which might be referred to herein as an "app store"). As discussed above, an app store is an electronic marketplace where customers can browse and purchase application programs for download and use on their own customer devices, such as the user device 118. An app store can offer applications for use on user devices 118 such as, but not limited to, smart phones, tablet or slate computers, set-top boxes, e-readers, laptop or desktop computers, and/or other types of computing devices.

In order to provide the app store and, potentially, the other functionality disclosed herein, the application store system 302 can include one or more application servers (not shown in FIG. 3). The application servers can execute a number of software components in order to provide the app store services described herein. The software components can execute on a single application server or in parallel across multiple application servers. In addition, each software component can consist of a number of subcomponents executing on different application servers or other virtual or physical computing resources. Various components can be implemented as software, hardware, or any combination of the two.

It should be appreciated that the application store system 302 shown in FIG. 3 has been greatly simplified for discussion purposes and that many additional software and hardware components can be utilized. In particular, the application store system 302 can interoperate with many other computing systems in order to provide an app store. For example, the application store system 302 can interoperate with other systems and/or services not shown in FIG. 3, such as billing systems, reporting systems, customer relationship management systems, and others.

As discussed briefly above, a user 120 of the app store provided by the application store system 302 can use the user device 118 to access the app store through a network (not shown in FIG. 3), such as the Internet. The user 120 can be an individual or entity that desires to browse, purchase, or has purchased, one or more applications from the app store. As also discussed briefly above, the user device 120 can be a smartphone, personal computer, desktop workstation, laptop computer, tablet computer, notebook computer, personal digital assistant ("PDA"), electronic-book reader, game console, set-top box, consumer electronics device, server computer, or any other type of computing device capable of connecting to a data communications network and communicating with the application store system 302. The network utilized by the user device 118 to connect to the application store system 302 can be a local-area network ("LAN"), a wide-area network ("WAN"), the Internet, or any other networking topology known in the art that connects a user device 118 to the application store system 302.

In some configurations, software components executing within the application store system 302 provide functionality for permitting customers, such as the user 120, to browse and purchase applications available from the app store. For instance, the app store system 302 can receive a page request 310 from the user device 118 and, in response thereto, retrieve content regarding a particular application or applications offered for sale from the app store referenced by the page request 310, generate or retrieve content describing the application or applications, and transmit an app store page 312 containing the content over a network to an application store client application 304 executing on the user device 118 for display to the user 120 in an appropriate application store UI 314. The application store page 312 can include a name of an application, the name of the application developer that developed the application, a text description of the application, one or more images, videos, or audio files, a price for the application, and/or other information. This content can be stored in a suitable database (e.g. the application catalog 308 shown in FIG. 3) or other type of data store maintained by the application store system 302 for each application offered for sale.

As also discussed briefly above, the customer 104 can use the application store client application 304 executing on the user device 118 to access and utilize the functionality provided by the application store system 302. The application store client application 304 can be a web browser or a stand-alone client application configured for communicating with the application store system 302 and presenting a suitable application store UI 314 for interacting with the application store system 302. The application store client application 304 can also utilize any number of communication methods known in the art to communicate with the application store system 302 across a network, including remote procedure calls, network service calls, remote file access, proprietary client-server architectures, and the like.

The application store system 302 can also provide functionality for allowing application developers (not shown in FIG. 3) to submit applications for inclusion in the app store. For example, and without limitation, the application store system 302 can be configured to provide an application store developer portal (also not shown in FIG. 3) in some configurations. The application store developer portal provides a web-based or other type of interface through which an application developer can create a new developer account in the app store, submit an application for inclusion in the app store, and define application metadata for the application, such as a description of the application, the price for the application, if any, and other information pertinent to the application. The application developer can also specify content for display to users 120 browsing or searching the app store. For example, and without limitation, an application developer can specify text, images, videos, audio files, and other types of content that is associated with an application and that is to be displayed in the application store UI 314 when a user 120 is browsing or searching the app store.

The application metadata specified by an application developer can also include data IAP items, such as available IAP items for an application, purchase term, price, etc. As mentioned briefly above, an IAP item is an item that a customer can purchase from within an application provided by the app store. IAP items can include, but are not limited to, subscriptions, consumables, and entitlements. An in-application subscription can be made any type of content that carries an entitlement, is bound by a period of time, and can auto-renew at the end of the period. A consumable in-application purchase is content that is used within an application, such as perishable items like extra lives in a game or in-application currency. An entitlement is content that requires access rights to access, such as a purchased copy of an electronic magazine issue or the unlocking of a level in a game. It should be appreciated that these examples are merely illustrative and that an application developer can define metadata for other types of IAP items in other configurations.

The app store UI 314 is configured in some implementations with predefined on-screen areas for presenting application-related content, such as images or videos, which might be referred to herein as "slots" or "content slots." For example, a storefront page or a category page of the app store can utilize content slots in which images are displayed that correspond to applications available from the application store. When the user 120 selects the image or other content in a content slot, the application store UI 314 can present additional information about the associated application, such as user reviews of the application for example, along with UI controls for purchasing the application. The app store UI 314 can also present live streams 106, as will be described in greater detail below.

In order to obtain the content to be presented in the content slots of the application store UI 314, the application store client application 304 can transmit content requests to the application store system 302, such as the page request 126. In one particular configuration, the content requests are received by a recommendations service (not shown in FIG. 3) that executes within or in conjunction with the application store system 302. The recommendations service utilizes various mechanisms to select content for presentation in the application store UI 314 that is personalized for the user 120 and, potentially, for the particular type of user device 118 making the content request. For example, and without limitation, the recommendations service can select applications and their associated content for display based upon various attributes associated with the requesting user 120, such as the user's demographic information, stated preferences, previous purchase history, browsing history, and/or other attributes. Attributes of the user device 120 making the request 310 can also be utilized to select the content. In one implementation, an appropriate data store, such as the customer data store 306 shown in FIG. 3, can be utilized to store data defining the customer attributes. Other data stores can also be utilized in other configurations.

The application store system can also sort the selected content in order to present the most desirable content first in the application store UI 314 and/or filter the selected content to remove any content corresponding to applications that the requesting user 120 has purchased previously from the app store. Other personalization operations and/or optimizations can also be applied to content before it is provided to the user device 118 in response to a page request 310.

The application store system 302, or some other computing device or service, can also facilitate the acquisition of the applications from the app store. In this regard, the application store system 302 can receive payment information from user device 118. The application store system 302 can also establish an account or update an account for a user 120. The account information can include a variety of different information, such as one or more payment methods, billing preferences, address information, communication preferences, privacy preferences, and the like. This information can be obtained by the application store system 302 and provided to a billing service (not shown in FIG. 3). The billing service an also be configured to process payments from users and, in some configurations, provide payment to the software providers of the applications available in the app store.

As discussed briefly above, a mechanism can also be provided for integrating the app store system 302 with the live streaming video service 102. In particular, page requests 310 submitted to the app store system 302 by the app store client application 304 can also include context data 126, such as but not limited to that described above. The app store system 302 can supply the provided context data 126 in calls to the network service API 132 exposed by the live streaming video service 102 to obtain IDs 134 for live video streams 106 relevant to the user 120 browsing or searching the app store.

In some configurations, the app store system 302 also supplies additional context data 126A. For example, and without limitation, the additional context data 126A can identify the page that the app store client application 304 has requested from the app store system 302. In this way, live video streams 106 can be selected that include content relevant to the content contained in the requested page in the app store. The additional context data 126A can also indicate previous application purchases or IAP items purchased by the user from the app store. The additional context data 126A can also specify the dates or the application and IAP purchases. This data can be utilized to select live video streams 106 for presentation to the user 120 that are relevant to the more recent applications or IAP items purchased by the user 120.

The additional context data 126A can also be utilized by the live streaming video service 102 to select live video streams 106 relevant to the user 120. For example, and without limitation, the additional context data 126A can be used to select live video streams 106 showing the use (e.g. gameplay) of an application that the user 120 is viewing in the app store. As another example, the additional context data 126A can be used to select live video streams 106 showing the use of an IAP item that the user 120 is viewing in the app store. As a further example, the additional context data 126A can be used to select live video streams 106 showing reviews or other information about an application or an IAP item that the user 120 is viewing in the app store. Other types of live video streams 106 can also be selected in a similar fashion.

Once the live streaming video service 102 has identified one or more relevant live video streams 106, the live video streaming service 102 provides a reply to the stream request 128 submitted by the app store system 302 with the IDs 134 of the identified live video streams 106. For example, the live streaming video service 102 can provide network addresses for the live video streams 106 that can be utilized by app store client application 304 executing on the user device 118 to retrieve the live video streams 106. In turn, the app store system 302 provides the IDs 134 to the requesting app store client application 304 in an app store page 312.

The app store client application 304 can then render the app store page 312 in order to generate the app store GUI 314. In particular, the app store client application 304 can utilize the provided IDs 134 to retrieve the identified live video stream 106, or streams, from the live streaming video service 102, and display the stream 106 in the app store GUI 314. For example, and without limitation, using this mechanism, the app store client application 304 can present a live video stream 106A showing gameplay from a game that the user 120 is viewing in the app store. In another example, a live video stream 106A can be presented that shows the use of an IAP item that the user 120 is viewing in the app store. In this manner, the user 120 can obtain live video streams 106 that include content that is relevant to their particular location within an app store and/or relevant to their previous purchase history from the app store in a seamless and automated fashion. Other types of live video streams 106 containing other types of content can also be selected and provided to a user 120 while searching or browsing an app store in a similar fashion.

In one configuration, a live video stream 106 can be offered as an IAP item. In this configuration, the metadata 114 can included data that identifies a price for a live video stream 106. The application store system 302 can also provide functionality for offering the live video stream 106 as an IAP item, for receiving a request to purchase a live video stream 106 as an IAP item, for charging an account associated with a user 120 for the purchase of the live video stream 106 (e.g. a one-time charge or a charge per minute or other time period), and for delivering the live video stream 106 in the manner described herein. Other mechanisms can also be utilized to charge a fee for viewing of a live video stream 106 available from the live video service 102.

FIG. 4 is a flow diagram showing several routines 400, 420, and 440 that together illustrate further aspects of the mechanism shown in FIG. 3 for integrating the live streaming video service 102 with the application store system 302. The routine 400 illustrates operations performed by the application store client application 304 executing on the user device 118, the routine 420 illustrates operations performed by the application store system 302, and the routine 440 illustrates aspects of operations performed by the live streaming video service 102. The routines 400, 420, and 440 will be described together below.

The routine 400 begins at operation 402, where the application store client application 304 obtains or generates the context data 126. As discussed above, the context data 126 might identify the user 120, identify the type of user device 118 upon which the app store client application 304 is executing, and/or provide other indicators of the current state of the application 304, the user device 118, and/or the user 120. Once the context data 126 has been obtained or generated, the routine 400 proceeds from operation 402 to operation 404.

At operation 404, the app store client application 304 generates a page request 310 to the app store system 302. As discussed above, the page request 310 requests a page from the application store system 302 that includes content relating to an application, group of applications, IAP items, or other content available from the app store system 302. The page request 310 can also include the context data 126 generated or obtained at operation 402.

The app store system 302 receives the page request 310 from the application store client application 304 at operation 422 of the routine 420. The routine 420 then proceeds to operation 424, where the app store system 302 generates a stream request 128 to the network service API 132 exposed by the live streaming video service 102. As discussed above, the stream request 128 can include the context data 126 provided by the app store client application 304 and additional context data 126A generated by the app store system 302. The live streaming video service 102 receives the stream request 128 at operation 442 of the routine 440.

The routine 440 proceeds from operation 442 to operation 444, where the live streaming video service 102 identifies one or more live video streams 106 relevant to the context of the app store client application 304, the app store system 302, the device 118, and/or the user 120. In particular, and as described above, the live streaming video service 102 can search the metadata 114 stored in the metadata data store 116 for terms present in the context data 126 and/or the additional context data 126A to identify relevant video streams 106. Other mechanisms can also be utilized. Once any relevant video streams 106 have been identified, the routine 440 then proceeds from operation 444 to operation 446, where the stream IDs 134 for the identified live video streams 106 are returned to the app store system 302 in response to the stream request 128. The routine 440 then proceeds from operation 246 to operation 448, where it ends.

The app store system 302 receives the live video stream IDs 134 at operation 428 of the routine 420. The routine 420 then proceeds from operation 428 to operation 430, where the app store system 420 generates an app store page 312 that includes the live video stream IDs 134. As discussed above, the app store page 312 can also include other text, graphics, and/or other content for an application or IAP item available from the app store. The routine 420 then proceeds from operation 430 to operation 432, where it ends.

The app store client application 304 receives the app store page 312, including the stream IDs 134, at operation 406 of the routine 400. The routine 400 then proceeds from operation 406 to operation 408, where it renders the app store page 312 to generate the app store UI 314. As discussed above, the app store UI 314 includes a display of the live video stream 106, or streams, referenced by the received live video stream IDs 134 included in the app store page 312. The app store client application 304 can utilize an appropriate network streaming protocol to stream the live video streams 106 from the live streaming video service 102. The live video stream 106 presented in the app store GUI 314 can be presented full screen, in a window, as a semi-transparent overlay, or in another manner. The user 120 can also be permitted to select, close, enlarge, pause, stop, or otherwise modify the live video stream 106 shown in the app store UI 314. From operation 408, the routine 400 proceeds to operation 410, where it ends.

It should be appreciated that the mechanism described above with regard to FIGS. 3 and 4 is merely illustrative and that other configurations can be utilized. For example, and without limitation, the functionality described above can be performed continuously or at various times while a user is searching or browsing the app store provided by the app store system 302 in order to provide live video streams 106 to the user 120 that are relevant to the portion of the app store that the user 120 is viewing at a particular point in time. For example, and without limitation, a new live video stream 106 can be obtained and presented to the user 120 in the manner described above when the user launches the app store client application 304, when a user requests an app store page 312 for a particular category or application, and/or at other times.

Figure 5:
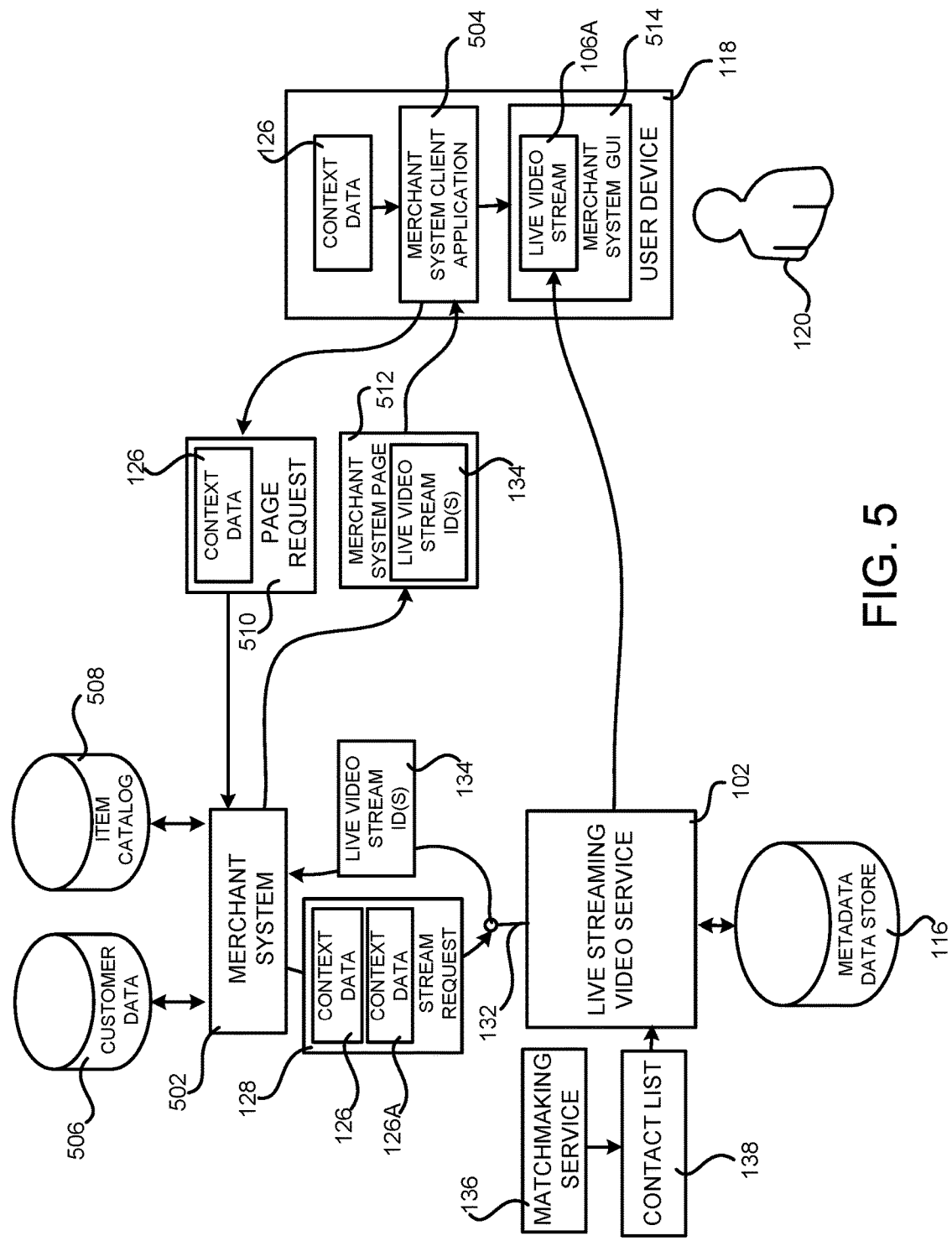
FIG. 5 is a system architecture diagram showing aspects of the configuration and operation of one mechanism disclosed herein for integrating a live streaming video service with a merchant system.

FIG. 5 is a system architecture diagram showing aspects of the configuration and operation of one mechanism disclosed herein for integrating the live streaming video service 102 with a merchant system 502. As shown in FIG. 5, the user 120 can utilize the user device 120 to access the merchant system 502 across a network, such as the Internet. The user 120 can be an individual or entity that desires to browse, research, review, and/or purchase items offered for sale by an operator of the merchant system 502. As mentioned above, items available for sale through the merchant system 502 can include, but are not limited to: physical goods, such as TVs, a game consoles, cameras, bikes, and Compact Disks; digital media products, such as digital audio or video tracks or streaming media; event tickets; media or service subscriptions; and virtually any other type of good or service.

In order to provide the disclosed functionality, the merchant system 502 can include a number of application servers (not shown in FIG. 5) that provide various online shopping services to the user device 118 over a network. The user 120 can use a merchant system client application 504 executing on the user device 118 to access and utilize the online shopping services provided by the merchant system 502.

In one configuration, the client application is a web browser application, such as the MOZILLA FIREFOX web browser from MOZILLA FOUNDATION of Mountain View, Calif. In this configuration, the web browser application can exchange data with the application servers in the merchant system 502 using the hypertext transfer protocol ("HTTP"). Alternatively, the merchant system client application 502 can be a client-side software application configured specifically for providing access to the online shopping services offered by the merchant system 502. In this regard, it should be appreciated that the merchant system client application 504 can utilize any number of communication methods and protocols known to communicate with the merchant system 502 across a network, including remote procedure calls, SOAP-based web services, remote file access, proprietary client-server architectures, and the like.

The application servers operating in the merchant system 502 can execute a number of modules in order to provide online shopping services to the user 120. The modules can execute on a single application server or in parallel across multiple application servers in the merchant system 502. In addition, each module can consist of a number of subcomponents executing on different application servers or other computing devices in the merchant system 502. The modules can be implemented as software, hardware, or any combination of the two.

In one configuration, the merchant system 502 provides on-line shopping functionality through which the user 120 can browse and purchase items available from the retailer that operates the merchant system 502. For instance, an application server operating in the merchant system 502 can receive a page request 510 from the merchant system client application 504, retrieve information regarding a particular item or items offered for sale by the retailer from an item catalog 508, generate a merchant system page 512 containing various types of information about the item or items, and transmit the page 512 over a network to the merchant system client application 504 executing on the user device 118 for display to the user 120 in an appropriate GUI (shown in FIG. 5 as the merchant system GUI 514).

Servers operating within the merchant system 502 can also provide an electronic shopping cart containing items that the user 120 intends to purchase. The merchant system 502 can further provide a checkout user interface (not shown in FIG. 3), through which the user 120 can complete the purchase of the items in their electronic shopping cart. Once the merchant system 502 receives an order, the merchant system 502 can process the order. For example, for physical items, the merchant system 502 can inform a fulfillment center (not shown in FIG. 5) to fulfill the order. Personnel at the fulfillment center can then retrieve the items from inventory, and pack and ship the ordered items to the user 120. For digital items, the ordered items can be transmitted from the merchant system 502 or a content distribution network ("CDN") to the user device 120. Other mechanisms can also be utilized to fulfill orders placed at the merchant system 502.

As discussed briefly above, a mechanism can also be provided for integrating the merchant system 502 with the live streaming video service 102. In particular, and as discussed briefly above, a page request 510 submitted to the merchant system 502 by the merchant system client application 504 can also include context data 126, such as but not limited to that described above. The merchant system 502 can supply the provided context data 126 in calls to the network service API 132 exposed by the live streaming video service 102 to obtain IDs 134 for live video streams 106 that are relevant to the user browsing or searching the e-commerce store.

In some configurations, the merchant system 502 also supplies additional context data 126A. For example, and without limitation, the additional context data 126A can identify the page of the e-commerce store that the merchant system client application 504 has requested from the merchant system 502. In this way, live video streams 106 can be selected that include content relevant to the page of the e-commerce store that the user 120 has requested. The additional context data 126A can also identify previous purchases made by the user from the e-commerce store. This additional context data 126A can also be utilized by the live streaming video service 102 to select live video streams 106 that are relevant to the user 120.

Once one or more relevant live video streams 106 have been identified, the live video streaming service 102 provides a reply to the merchant system 502 with the IDs 134 of the identified live video streams 106. For example, the live streaming video service 102 can provide network addresses for the live video streams 106 that can be utilized by the merchant system client application 504 executing on the user device 118 to retrieve the referenced live video streams 106. In turn, the merchant system 502 provides the IDs 134 to the requesting merchant system client application 504.

The merchant system client application 504 can then utilize the IDs 134 to retrieve the identified live video stream 106, or streams, from the live streaming video service 102, and display the stream in the merchant system GUI 514. For example, and without limitation, using the mechanism described above, the merchant system client application 504 can present a live video stream 106 showing the use of an item shown on a merchant system page 512 that the user is viewing in the e-commerce store provided by the merchant system 502. In this manner, the user 120 can obtain live video streams 106 that include content that is relevant to their particular location within the e-commerce store and/or relevant to their previous purchase history from the e-commerce store in a seamless and automated fashion. Other types of live video streams 106 containing other types of content can also be selected and provided to a user 120 while searching or browsing an e-commerce store in a similar fashion.

FIG. 6 is a flow diagram showing several routines 600, 620, and 640 that together illustrate further aspects of the mechanism shown in FIG. 5 for integrating the live streaming video service 102 with the merchant system 502. The routine 600 illustrates operations performed by the merchant system client application 504 executing on the user device 118, the routine 620 illustrates operations performed by merchant system 502, and the routine 640 illustrates aspects of operations performed by the live streaming video service 102. The routines 600, 620, and 640 will be described together.

The routine 600 begins at operation 602, where the merchant system client application 504 obtains or generates the context data 126. As discussed above, the context data 126 might identify the user 120, identify the type of user device 118 upon which the merchant store client application 504 is executing, and/or provide other indicators of the current state of the application 504, the user device 118, and/or the user 120. Once the context data 126 has been obtained or generated, the routine 600 proceeds from operation 602 to operation 604.

At operation 604, the merchant system client application 504 generates a page request 510 to the merchant system 502. As discussed above, the page request 510 requests a page from the merchant system 502 that includes content relating to an item available from the e-commerce store provided by the merchant system 502. The page request 510 can also include the context data 126 generated or obtained at operation 602.

The merchant system 502 receives the page request 510 from the merchant system client application 504 at operation 622 of the routine 620. The routine 620 then proceeds to operation 624, where the merchant system 502 generates a stream request 128 to the network service API 132 exposed by the live streaming video service 102. As discussed above, the stream request 128 can include the context data 126 provided by the merchant system client application 504 and additional context data 126A generated by the merchant system 502. The live streaming video service 102 receives the stream request 128 at operation 642 of the routine 640.

The routine 640 proceeds from operation 642 to operation 644, where the live streaming video service 102 identifies one or more live video streams 106 relevant to the context of the merchant system client application 504, the merchant system 502, the device 118, and/or the user 120. In particular, and as described above, the live streaming video service 102 can search the metadata 114 stored in the metadata data store 116 for terms present in the context data 126 and/or the additional context data 126A to identify relevant video streams 106. Other mechanisms can also be utilized.

Once any relevant video streams 106 have been identified, the routine 640 then proceeds from operation 644 to operation 646, where the stream IDs 134 for the identified live video streams 106 are returned to the merchant system 502 in response to the stream request 128. The routine 640 then proceeds from operation 646 to operation 648, where it ends.

The merchant system 502 receives the live video stream IDs 134 at operation 628 of the routine 620. The routine 620 then proceeds from operation 628 to operation 630, where the merchant system 502 generates an merchant system page 512, which might be called an item page, that includes the live video stream IDs 134. As discussed above, the merchant system page 512 can also include other text, graphics, and/or other content for an item available from the e-commerce store provided by the merchant system 502. The routine 620 then proceeds from operation 630 to operation 632, where it ends.

The merchant system client application 504 receives the merchant system page 512, including the stream IDs 134, at operation 606 of the routine 600. The routine 600 then proceeds from operation 606 to operation 608, where it renders the merchant system page 512 to generate the merchant system GUI 514. As discussed above, the merchant system GUI 514 includes a display of the live video stream 106, or streams, referenced by the received live video stream IDs 134 included in the merchant system page 512. As in the other configurations described above, the merchant system client application 504 can utilize an appropriate network streaming protocol to stream the live video streams 106 from the live streaming video service 102. The live video stream 106 presented in the merchant system GUI 514 can be presented full screen, in a window, as a semi-transparent overlay, or in another manner. The user 120 can also be permitted to select, close, enlarge, pause, stop, or otherwise modify the live video stream 106 shown in the merchant system GUI 514. From operation 608, the routine 600 proceeds to operation 610, where it ends.

It should be appreciated that the mechanism described above with regard to FIGS. 5 and 6 is merely illustrative and that other configurations can be utilized. For example, and without limitation, the functionality described above can be performed continuously or at various times while a user is searching or browsing the e-commerce store provided by the merchant system 502 in order to provide live video streams 106 to the user 120 that are relevant to the portion of the e-commerce store that the user 120 is viewing at a particular point in time. For example, and without limitation, a new live video stream 106 can be obtained and presented to the user 120 in the manner described above when the user first visits the e-commerce store, when a user requests a merchant system page 512 for a particular item, and/or at other times.

Figure 7:
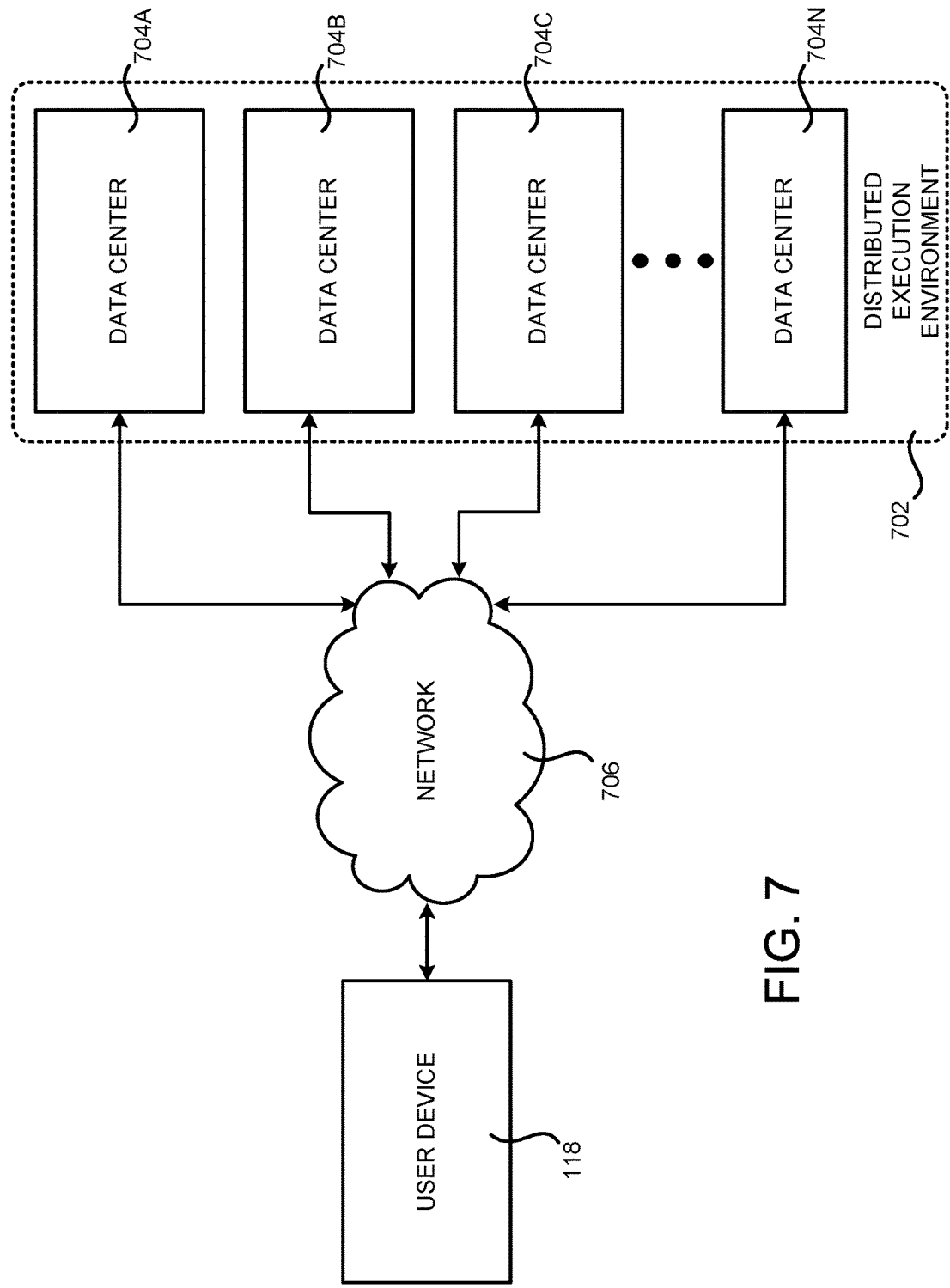
FIG. 7 is a computing system diagram that illustrates a configuration for a distributed computing network that can be utilized to implement aspects of the technologies disclosed herein.

FIG. 7 is a system and network diagram that shows aspects of a distributed execution environment 702 than can provide an operating environment for the various technologies disclosed herein. As will be discussed in greater detail below, the distributed execution environment 702 can provide computing resources for implementing the various technologies disclosed here including, but not limited to, the live streaming video service 102, the application store system 302, and the merchant system 402. The computing resources provided by the distributed execution environment 702 can include various types of computing resources, such as data processing resources, data storage resources, networking resources, data communication resources, network services, and the like.

Each type of computing resource provided by the distributed execution environment 702 can be general-purpose or can be available in a number of specific configurations. For example, data processing resources can be available as physical computers or virtual machine instances in a number of different configurations. The virtual machine instances can be configured to execute applications, including web servers, application servers, media servers, database servers, some or all of the services described herein, and/or other types of programs. Data storage resources can include file storage devices, block storage devices, and the like. The distributed execution environment 702 can also be configured to provide other types of resources and network services.

The computing resources provided by the distributed execution environment 702 are enabled in one implementation by one or more data centers 704A-704N (which might be referred herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that implements some of the technologies disclosed herein will be described below with regard to FIG. 8.

Users of the distributed execution environment 702 can access the various resources provided by the distributed execution environment 702 over a network 706, which can be a wide area communication network ("WAN"), such as the Internet, an intranet or an Internet service provider ("ISP") network or a combination of such networks. For example, and without limitation, a user device 118, such as that described above, can be utilized to access the live streaming video service 102, the application store system 302, and/or the merchant system 402 by way of the network 402. It should be appreciated that a local-area network ("LAN"), the Internet, or any other networking topology known in the art that connects the data centers 704 to remote users can also be utilized. It should also be appreciated that combinations of such networks can also be utilized.

Figure 8:
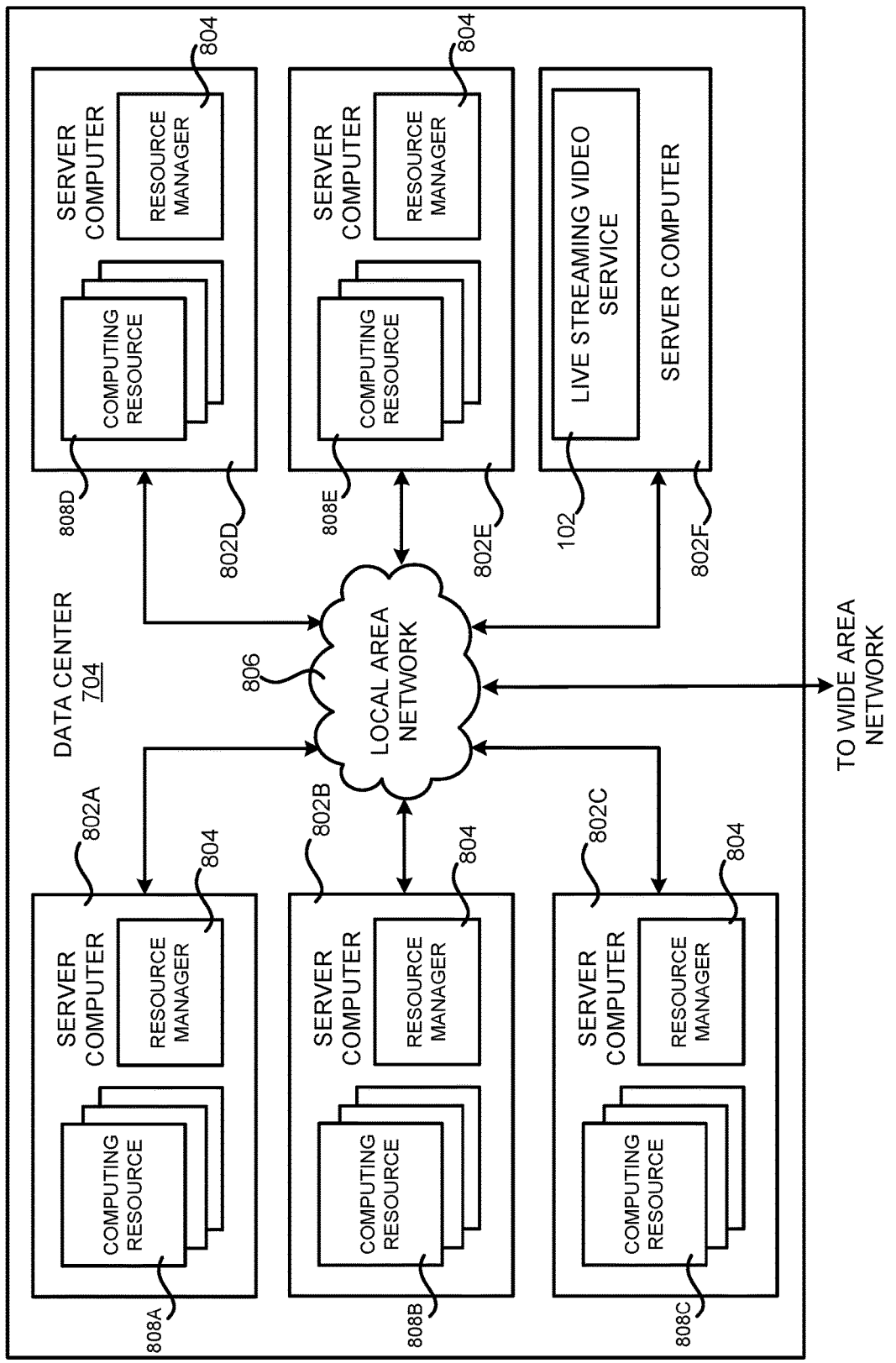
FIG. 8 is a computing system diagram that illustrates aspects of the configuration for a data center that can be utilized to implement aspects of the technologies disclosed herein.

FIG. 8 is a computing system diagram that illustrates one configuration for a data center 704 that can be utilized to implement aspects of the technologies disclosed herein. The example data center 704 shown in FIG. 8 includes several server computers 802A-802F (which might be referred to herein singularly as "a server computer 802" or in the plural as "the server computers 802") for providing computing resources 808A-808E.

The server computers 802 can be standard tower, rack-mount, or blade server computers configured appropriately for providing the computing resources 808. As mentioned above, the computing resources 808 can be data processing resources such as virtual machine instances or hardware computing systems, data storage resources, database resources, networking resources, and others. Some of the servers 802 can also be configured to execute a resource manager 804 capable of instantiating and/or managing the computing resources 808. In the case of virtual machine instances, for example, the resource manager 804 can be a hypervisor or another type of program configured to enable the execution of multiple virtual machine instances on a single server 802. Server computers 802 in the data center 704 can also be configured to provide network services and other types of services for supporting provision of the live video stream service 102, the application store system 302, and/or the merchant system 402, and the related functionality described herein.

The data center 704 shown in FIG. 8 also includes a server computer 802F that can execute some or all of the software components described above. For example, and without limitation, the server computer 802F can be configured to execute software components for providing the live streaming video service 102. The server computer 802F can also be configured to execute other components and/or to store data for providing some or all of the functionality described herein. In this regard, it should be appreciated that the software components illustrated in FIG. 8 as executing on the server computer 802F can execute on many other physical or virtual servers in the data centers 704 in various configurations.

In the example data center 704 shown in FIG. 8, an appropriate LAN 806 is also utilized to interconnect the server computers 802A-802F. The LAN 806 is also connected to the network 706 illustrated in FIG. 7. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704 and, potentially, between computing resources 808 in each of the data centers 704. It should be appreciated that the configuration of the data center 704 described with reference to FIG. 8 is merely illustrative and that other implementations can be utilized.

Figure 9:
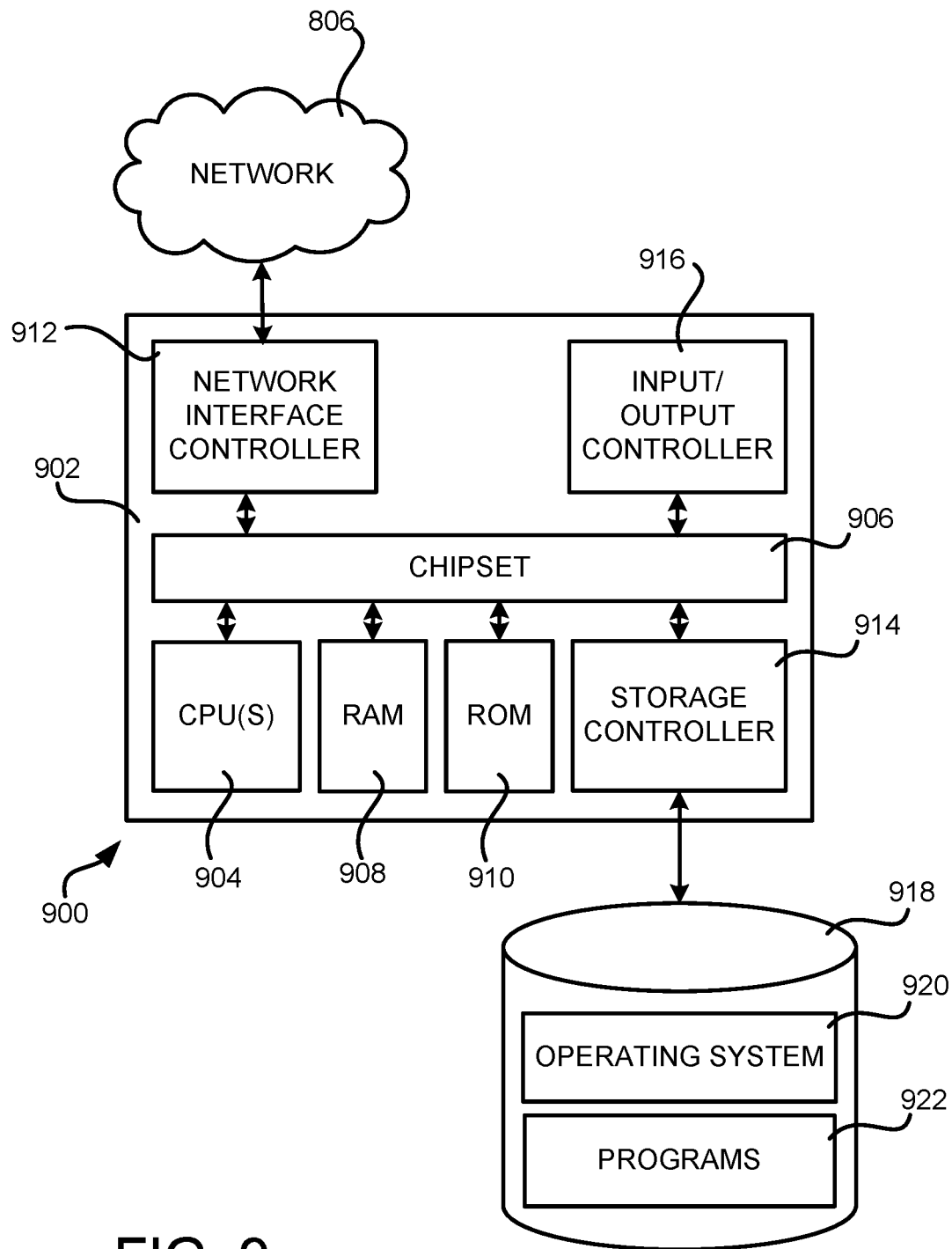
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing various aspects of the functionality described herein. The computer architecture shown in FIG. 9 illustrates a conventional server computer, workstation, desktop computer, laptop, tablet, network appliance, e-reader, smartphone, or other computing device, and can be utilized to execute any of the software components presented herein. For example, the computer architecture shown in FIG. 9 can be utilized to execute software components for providing the live video stream service 102, the application store system 302, and/or the merchant system 402, and the related functionality described herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 806. The chipset 906 can include functionality for providing network connectivity through a NIC 912, such as a gigabit Ethernet adapter. The NIC 912 is capable of connecting the computer 900 to other computing devices over the network 806. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. In one configuration, the operating system 920 is the LINUX operating system. In another configuration, the operating system 920 is the WINDOWS® SERVER operating system from MICROSOFT Corporation. In other configurations, the UNIX operating system or one of its variants can be utilized as the operating system 920. It should be appreciated that other operating systems can also be utilized. The mass storage device 918 can store other system or application programs and data utilized by the computer 900.

In one configuration, the mass storage device 918 or other computer-readable storage media is encoded with computer-executable instructions which, when loaded into the computer 900 and executed, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described herein. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, a plotter, or other type of output device. It will be appreciated that the computer 900 might not include all of the components shown in FIG. 9, can include other components that are not explicitly shown in FIG. 9, or might utilize an architecture completely different than that shown in FIG. 9.

It should be appreciated that while the configurations disclosed herein have been primarily presented in the context of integrating a live streaming video service with one or more external computing systems or services, the technologies disclosed herein can also be utilized in other environments. It should also be appreciated that although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus for integrating a live streaming video service with an application executing on a computing device, the apparatus comprising:
   a processor; and
   a non-transitory computer-readable storage medium having instructions stored thereupon which are executable by the processor and which, when executed, cause the apparatus to:
      receive a request from the application executing on the computing device, by way of a network service application programming interface (API) exposed by the live streaming video service, for identifiers corresponding to one or more live video streams of a plurality of live video streams, the request comprising context data, wherein the context data comprises data identifying an in-application purchase item of content that is used within a video game and that is being shown to a first user in an application store;
      responsive to receiving the request, utilize the data identifying the in-application purchase item of the content that is used within the video game and metadata associated with the plurality of live video streams to identify the one or more live video streams from the plurality of live video streams; and
      provide the identifiers corresponding to the one or more live video streams to the computing device in response to the request, whereby the application executing on the computing device can utilize the identifiers to obtain the one or more live video streams from the live streaming video service, the one or more live streams streamed from one or more devices on which one or more other users perform game play and showing use of the in-application purchase item that is being shown to the first user in the application store.

2. The apparatus of claim 1, wherein the application executing on the computing device comprises a live streaming client application configured to receive a stream request from a second application by way of a local API, and to provide the identifiers corresponding to the one or more live video streams to the second application responsive to the stream request.

3. The apparatus of claim 2, wherein context data further comprises data defining a state of the second application at a time the stream request is made to the local API.

4. The apparatus of claim 1, wherein the context data further comprises data identifying a type of the computing device.

5. The apparatus of claim 1, wherein the metadata associated with the plurality of live video streams comprises data defining a state of an application shown in the plurality of live video streams.

6. The apparatus of claim 1, wherein the non-transitory computer-readable storage medium has further instructions stored thereupon to expose a network service API for receiving the metadata associated with the plurality of live video streams.

7. A non-transitory computer-readable storage medium having computer-executable instructions stored thereupon which, when executed by a computer, cause the computer to:
   expose a network service application programming interface (API) by way of a live streaming video service;
   receive a request by way of the API for identifiers corresponding to one or more live video streams of a plurality of live video streams, the request comprising context data, wherein the context data comprises data identifying an in-application purchase item of content that is used within a video game and that is being shown to a first user in an application store;
   utilize the data identifying the in-application purchase item of the content that is used within the video game and metadata associated with the plurality of live video streams to identify the one or more live video streams from the plurality of live video streams; and
   provide the identifiers corresponding to the one or more live video streams in response to the request, whereby the identifiers can be utilized to obtain the one or more live video streams from the live streaming video service, the one or more live streams streamed from one or more devices on which one or more other users perform game play and showing use of the in-application purchase item that is being shown to the first user in the application store.

8. The non-transitory computer-readable storage medium of claim 7, wherein the request is received from a live streaming client application executing on a user device, the live streaming client application configured to expose a local API on the user device through which an application executing on the user device can obtain the identifiers corresponding to the one or more live video streams.

9. The non-transitory computer-readable storage medium of claim 8, wherein the context data further comprises data defining a state of the application executing on the user device at a time the application executing on the user device calls the local API for the identifiers corresponding to the one or more live video streams.

10. The non-transitory computer-readable storage medium of claim 7, wherein the request is received from an application store system.

11. The non-transitory computer-readable storage medium of claim 7, wherein the request is received from a merchant system, and wherein the request further comprises additional context data generated by the merchant system.

12. The non-transitory computer-readable storage medium of claim 11, wherein the additional context data generated by the merchant system comprises data identifying an item page that has been requested from the merchant system.

13. The non-transitory computer-readable storage medium of claim 7, wherein a contact list obtained from a matchmaking service is further utilized to identify the one or more live video streams from the plurality of live video streams.

14. A computer-implemented method, comprising:
   exposing a network service application programming interface (API) by way of a live streaming video service;
   receiving a request by way of the API for identifiers corresponding to one or more live video streams of a plurality of live video streams, the request comprising context data, wherein the context data comprises data identifying an in-application purchase item of content that is used within a video game and that is being shown to a first user in an application store;
   utilizing the data identifying the in-application purchase item of the content that is used within the video game and metadata associated with the plurality of live video streams to identify the one or more live video streams from the plurality of live video streams; and
   providing the identifiers corresponding to the one or more live video streams in response to the request, whereby the identifiers can be utilized to obtain the one or more live video streams from the live streaming video service, the one or more live streams streamed from one or more devices on which one or more other users perform game play and showing use of the in-application purchase item that is being shown to the first user in the application store.

15. The computer-implemented method of claim 14, wherein the request is received from a live streaming client application executing on a user device, and wherein the live streaming client application is configured to expose a local API on the user device through which an application executing on the user device can obtain the identifiers corresponding to the one or more live video streams.

16. The computer-implemented method of claim 15, wherein the context data further comprises data defining a state of the application executing on the user device at a time the application executing on the user device calls the local API to obtain the identifiers corresponding to the one or more live video streams.

17. The computer-implemented method of claim 14, wherein the request is received from an application store system.

18. The computer-implemented method of claim 14, wherein the request is received from a merchant system, wherein the request further comprises additional context data generated by the merchant system, and wherein the additional context data comprises data identifying an item page that has been requested from the merchant system.

19. The computer-implemented method of claim 14, further comprising:
   obtaining a contact list from matchmaking service; and
   identifying the one or more live video streams from the plurality of live video streams based, at least in part, upon the contact list.

\* \* \* \* \*